United States Patent [19]

Pysh

[11] 3,905,390

[45] Sept. 16, 1975

[54] SURGE PROTECTION VALVE

[75] Inventor: Wasyl A. Pysh, Erie, Pa.

[73] Assignee: Techno Corporation, Erie, Pa.

[22] Filed: Nov. 5, 1973

[21] Appl. No.: 412,781

[52] U.S. Cl. .................. 137/518; 137/519; 251/338
[51] Int. Cl.² ......................................... F16K 17/20
[58] Field of Search .......... 137/517, 518, 519, 520, 137/521, 522, 512.1; 251/82, 338

[56] References Cited
UNITED STATES PATENTS

| 883,878 | 4/1908 | Heath | 137/518 |
| 970,599 | 9/1910 | Arnold | 137/518 X |
| 1,065,023 | 6/1913 | Blood | 137/518 |
| 1,067,777 | 7/1913 | Arnold | 137/518 X |
| 1,079,824 | 11/1913 | Arnold | 137/518 X |
| 1,105,208 | 7/1914 | Robinson | 137/518 |
| 1,487,038 | 3/1924 | Spencer | 137/512.1 |
| 2,898,080 | 8/1959 | Smith | 251/82 |
| 3,718,156 | 2/1973 | Fujii | 137/517 X |

Primary Examiner—William R. Cline

[57] ABSTRACT

A surge protection valve is disclosed having a body, which will permit normal flow through the body but will close automatically when the flow exceeds a predetermined amount. The valve has two vanes that extend in a downstream direction so that the flow through the valve will tend to swing the vanes to closed position. A counterweight is connected to the vanes which urges the vanes toward open position. By adjusting the counterweight, the valve can be adjusted closed at a predetermined flow velocity.

2 Claims, 3 Drawing Figures

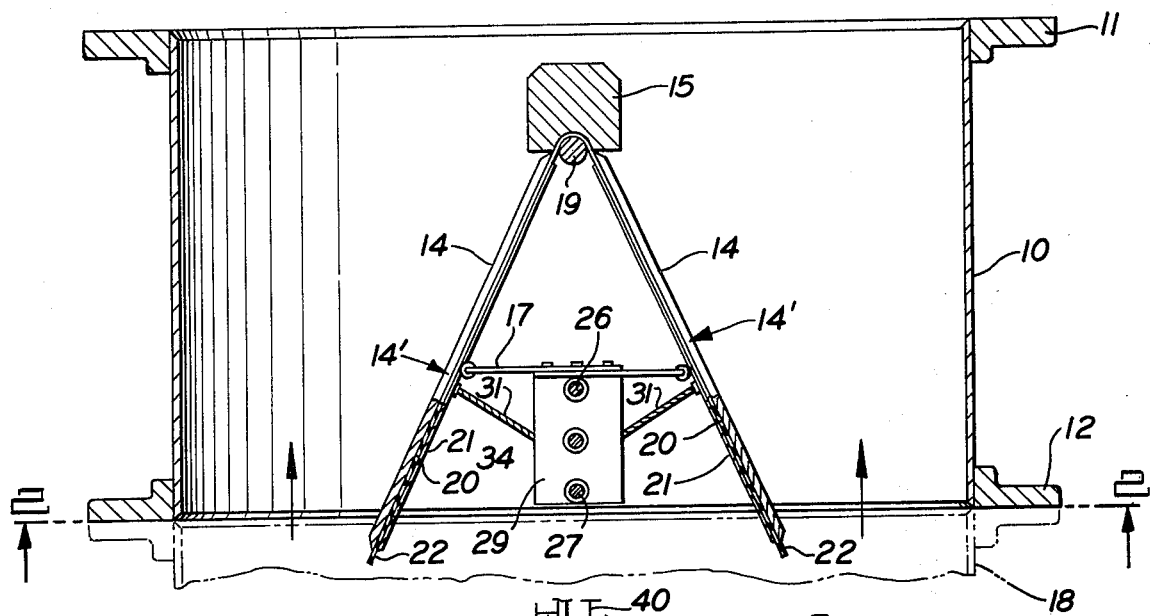
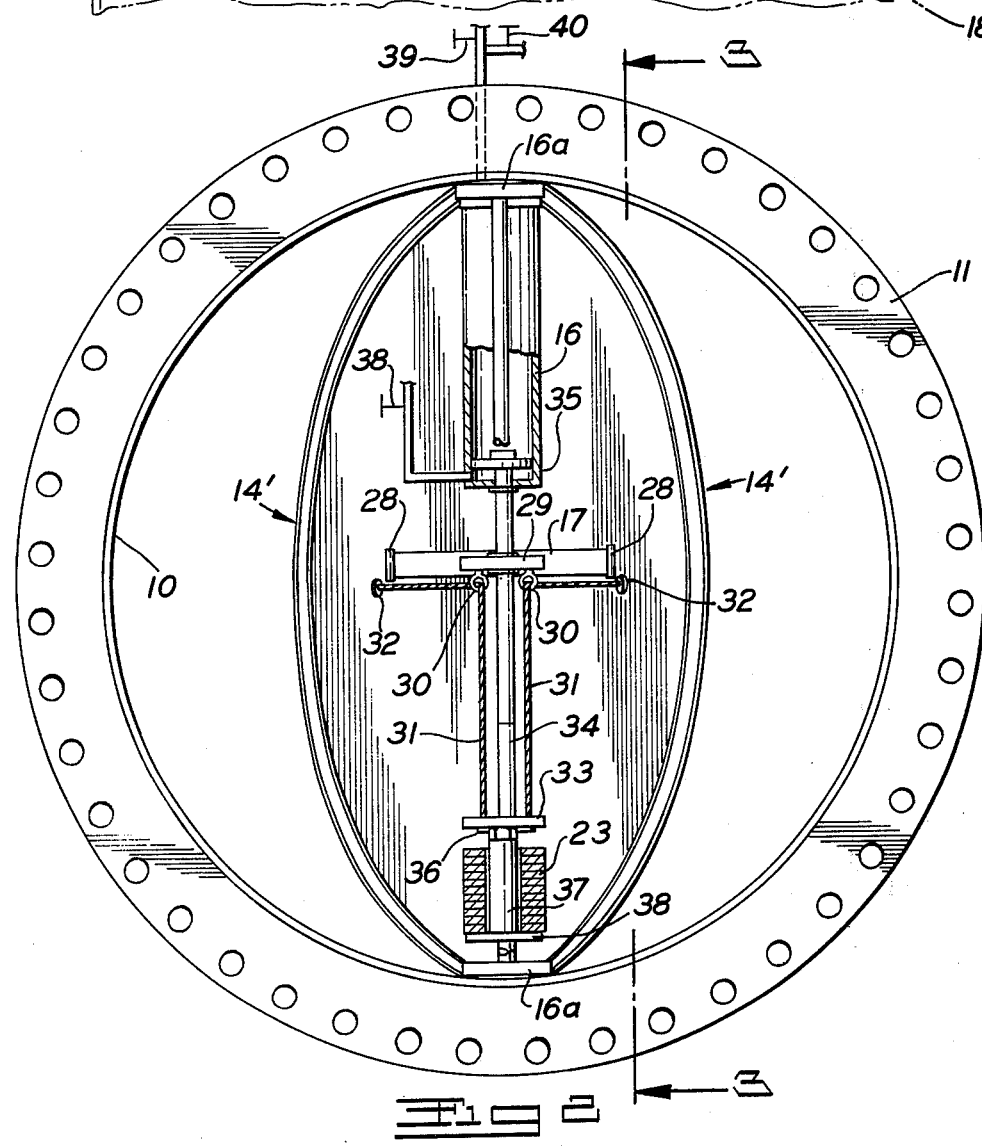

SURGE PROTECTION VALVE

REFERENCE TO PRIOR ART

The valve disclosed herein constitutes an improvement over the valves shown in U.S. Pat. Nos. 3,425,447, 2,388,073, and 2,898,080.

GENERAL STATEMENT OF INVENTION

The purpose of this valve is to permit the passage of some required normal flow of fluid through a pipe line or ductwork into which the valve has been installed, but the valve must close automatically when the flow velocity exceeds a predetermined critical point, such as a sudden surge caused by the negative pressure of a tornado acting to suddenly evacuate the pipe line or duct.

Such protection is required because the sudden evacuation of the system could cause pressures acting externally on the system to bring about the structural collapse of the pipe line or ducting on the apparatus being protected.

One important feature of the valve is its ability to sense when to remain open to permit the passage of flow under normal operating conditions, and when to close automatically, without the need for any external mechanical or electrical devices, under abnormal surge conditions. Such external devices are undesirable because of possible delays in responding to flow conditions, and because of their potential malfunction.

To accomplish the intended purpose, the valve is constructed to include: a body with suitable end connections for mounting in the pipe line or duct; two valve plates, of such configuration as to close off the valve opening when extended from a supporting structural member, located within the valve body, to the inside periphery of the valve body; and a mechanical linkage, also located within the valve body, and connecting the two valve plates to a counterweight.

The valve plates are constructed of a suitable material and are of a suitable size to withstand the design pressures involved in valve operation. They are joined to the main transverse structural member by means of a suitable hinge, which allows the plates to rotate about the structural member and extend to the inside wall of the valve body, thus closing off the flow through the valve. A resilient seal is provided at the edges of these plates to complete the sealing of the pipe line or duct.

OBJECTS OF THE INVENTION

It is an object of the invention to provide an improved flow control valve.

Another object of the invention is to provide an improved vaned valve.

Another object of the invention is to provide a valve that will automatically close when the flow through the valve exceeds a predetermined velocity.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

GENERAL DESCRIPTION OF THE DRAWINGS

FIG. 1 is a longitudinal cross sectional view of the valve according to the invention shown connected to a duct work in phantom.

FIG. 2 is a bottom view of the valve shown in FIG. 1.

DETAILED DESCRIPTION OF THE DRAWINGS

Figure 3:
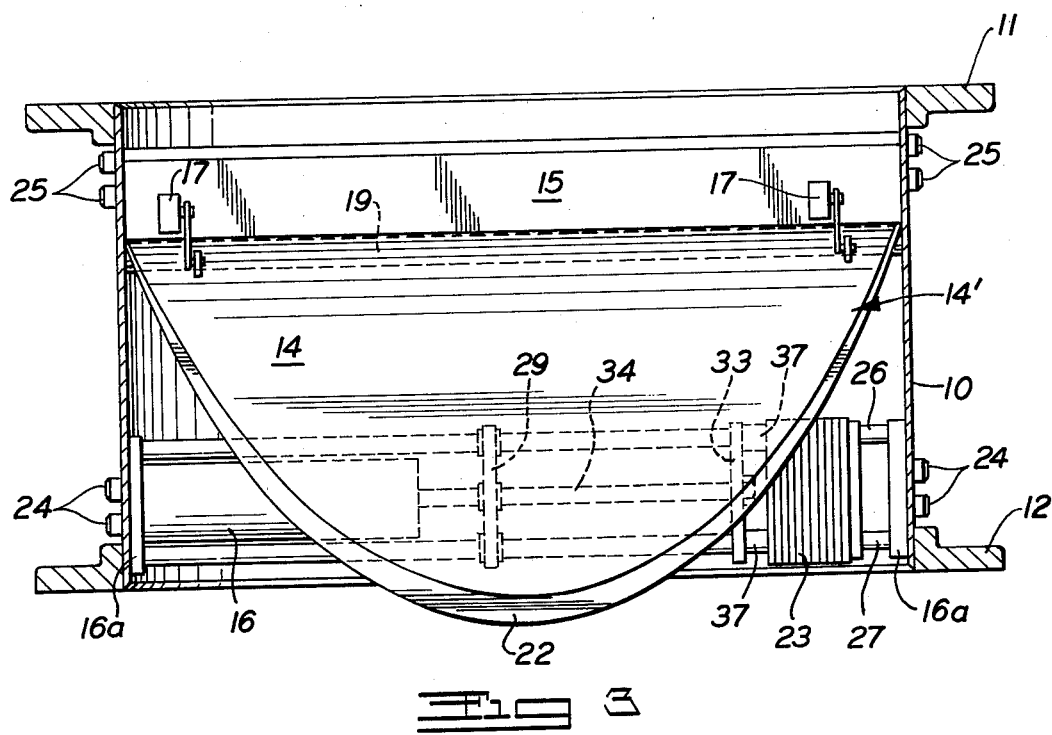
FIG. 3 is a cross sectional view of the valve taken on line 3—3 of FIG. 2.

Now with more particular reference to the drawings, FIGS. 1, 2 and 3 show a valve in which the body 10 is shown in the form of a hollow cylinder having a top flange 11 and a bottom flange 12 connected to the duct 18 in which ordinarily a fluid, such as air, will flow in the direction of the arrows, shown in FIG. 1.

The valve has two vanes 14 swingably supported on hinge rod supports 15. The ends of the hinge rod supports 15 are attached to the inside wall of the body 10 by means of studs 25. A hinge rod 19 is supported diametrically of the body and attached to rod supports 15 and extends diametrically across the body 10. Each vane is made up of a part of flexible sheet material 20, an outer plate 14' and an inner plate 21. Hinge rod 19 may be attached to rod support 15 by studs that pass through rod 19, sheet material 20 and rod support 15 or by any other well known fastening means.

The sheet material 20 is laid over the central hinge rod 19 and the plates 14' are swingably supported by the sheet material 20. The sheet material 20 is sandwiched between the outer plates 14' and the inner plates 21. Inner plates 21 have outer curved edges that conform to the shape of the inside periphery of the body when the valve is closed. The outside edges of the sheet material extends beyond the outside edges of the plates 14' and forms a seal with the inside periphery of the body when the vanes 14 are in the closed position.

The transverse rods 26 and 27 have their ends fixed to the support plate 16a and extend entirely diametrically across the valve body and slidably support weights 23. Cable guide 29 is fixed to rods 26 and 27 and has eye bolts 30 fixed to it. The cables 31 extend through eye bolts 30 and are attached to plates 21 at 32. The cables are fixed to plate 33 at their opposite end.

Weights 23 are supported on sleeves 37. Sleeves 37 are slidably supported on rods 26 and 27. The sleeves 37 are attached to plate 33 at one end and to plate 38 at the other end. Piston rod 34 is attached to plate 33.

Cylinder 16 has its end fixed to plate 16a at one end. Piston rod 34 is fixed to the piston in cylinder 35. When a force on valve plates 14' and 21 exceeds the force exerted by weights 23, sleeves 37 will carry weights 23 along rods 26 and 27 with members 33, 57 and 38 toward the center of the valve, moving piston 35 toward the fixed end of cylinder 16. Cylinder 16 may exhaust air at a pre-determined rate determined by the setting of a throttling valve 39 to limit the rate at which the piston moves in a direction away from the weights 23. The rate of movement of the piston toward the weights 23 is determined by the rate at which air is expelled from the cylinder controlled by the setting of the exhaust throttling valve 39. The piston attached to rod 34 acts as a dashpot to limit the rate of movement of vanes 14 and thereby prevent the vanes 14 from slamming closed.

The foregoing specification sets forth the invention in its preferred practical forms but the structure shown is capable of modification within a range of equivalents without departing from the invention which is to be understood is broadly novel as is commensurate with the appended claims.

The embodiments of the invention in which en exclusive property or privilege is claimed are defined as follows:

1. A valve comprising a hollow, generally cylindrical body,
   means for connecting said hollow body in a duct adapted to have a gas flowing therethrough,
   a hinge rod inside said body extending generally parallel to the diameter thereof and being fixed to said body,
   vanes swingably supported on said hinge rod and extending toward an inlet end of said body and outward toward the inner-periphery thereof,
   said vanes being adapted to be urged to swing toward the inner-periphery of said hollow body by the flow of gas therethrough from the inlet end,
   a cylinder supported in said hollow body forming a substantially closed cylindrical chamber,
   said cylindrical chamber having a piston therein,
   a piston rod attached to said piston extending diametrically of said body partially without said cylinder and within said body and generally parallel to said hinge rod,
   a pair of transverse rod means supported about said cylinder in said body and parallel to said piston rod,
   weight means slidably supported on said transverse rod means,
   said piston rod being connected to said weight means through plate attaching means for movement therewith,
   cable means connected to said vanes and to said attaching means such that movement of said piston rod and weight means in one direction exerts a force on said cable means tending to swing said vanes away from the inner-peripheral surface of said body,
   whereby said weight means bias said vanes to an open position and said cylindrical chamber and piston act as a dashpot preventing an excessive rate of closure of the vanes.

2. The valve recited in claim 1 wherein the weight means comprise a plurality of counterweights,
   and said counterweights can be added or removed for adjusting the flow velocity at which said vanes will close.

* * * * *